United States Patent [19]
Weingarden et al.

[11] Patent Number: 5,931,294
[45] Date of Patent: Aug. 3, 1999

[54] STORAGE CONTAINER FOR INFORMATION BEARING DISC DEVICES

[75] Inventors: Marshall Weingarden, 292 Myrtle St., Haworth; Allen Epstein, Clifton, both of N.J.

[73] Assignee: Marshall Weingarden, Haworth, N.J.

[21] Appl. No.: 08/953,712

[22] Filed: Oct. 17, 1997

Related U.S. Application Data

[60] Provisional application No. 60/028,833, Oct. 21, 1996, abandoned.

[51] Int. Cl.$^6$ ..................................................... B65D 85/57
[52] U.S. Cl. ........................ 206/308.1; 206/309; 206/493
[58] Field of Search ........................ 206/308.1, 309–313, 206/493, 303; 220/836, 837

[56] References Cited

U.S. PATENT DOCUMENTS

| | | |
|---|---|---|
| 4,076,119 | 2/1978 | Clarke . |
| 4,176,744 | 12/1979 | Borzak . |
| 4,327,831 | 5/1982 | Inaba et al. . |
| 4,488,645 | 12/1984 | Yamaguchi . |
| 4,535,888 | 8/1985 | Nusselder . |
| 4,702,369 | 10/1987 | Philosophe . |
| 4,722,439 | 2/1988 | Grobecker et al. . |
| 4,793,480 | 12/1988 | Gelardi et al. . |
| 4,819,799 | 4/1989 | Nomula et al. . |
| 4,895,252 | 1/1990 | Nomula et al. . |
| 4,903,829 | 2/1990 | Clemens . |
| 4,905,217 | 2/1990 | King et al. . |
| 5,086,923 | 2/1992 | King et al. . |
| 5,101,971 | 4/1992 | Grobecker . |
| 5,168,991 | 12/1992 | Whitehead et al. . |
| 5,188,228 | 2/1993 | Barrett . |
| 5,236,081 | 8/1993 | Fitzsimmons et al. . |
| 5,238,107 | 8/1993 | Kownacki . |
| 5,244,085 | 9/1993 | Lammerant et al. . |
| 5,253,751 | 10/1993 | Wipper . |
| 5,259,498 | 11/1993 | Weisburn et al. . |
| 5,269,409 | 12/1993 | Brandt et al. . |
| 5,284,242 | 2/1994 | Roth et al. . |
| 5,284,243 | 2/1994 | Gelardi et al. . |
| 5,366,074 | 11/1994 | O'Brien et al. . |
| 5,377,825 | 1/1995 | Sykes et al. . |
| 5,383,553 | 1/1995 | Lammerant et al. . |
| 5,421,453 | 6/1995 | Harrer et al. . |
| 5,433,319 | 7/1995 | Tang . |
| 5,462,159 | 10/1995 | Roth et al. . |
| 5,477,960 | 12/1995 | Chen . |
| 5,477,961 | 12/1995 | Taniyama . |
| 5,522,501 | 6/1996 | Luckow ................................ 206/308.1 |
| 5,529,182 | 6/1996 | Anderson et al. . |
| 5,531,324 | 7/1996 | Kosaki et al. . |
| 5,542,531 | 8/1996 | Yeung . |
| 5,544,741 | 8/1996 | Fantone et al. ....................... 206/308.1 |
| 5,551,559 | 9/1996 | Roth et al. . |
| 5,551,560 | 9/1996 | Weisburn et al. . |
| 5,597,068 | 1/1997 | Weisburn et al. ..................... 206/308.1 |
| 5,682,991 | 11/1997 | Lammerant et al. ................. 206/308.1 |
| 5,788,068 | 8/1998 | Fraser et al. ......................... 206/308.1 |

*Primary Examiner*—Paul T. Sewell
*Assistant Examiner*—Luan K. Bui
*Attorney, Agent, or Firm*—Bose, McKinney & Evans

[57] ABSTRACT

A storage container for a disc includes case member (10) including a cover member (16), a base member (18), and a hinge member (20) for joining the cover member (16) to the base member (18). The hinge member (20) allows the base member (18) and cover member (16) to pivot between a coplanar open position and an overlapping parallel plane closed position. A tray member (14) is also included that has a proximal end (96), a distal end (94), a disc receiving portion (98) disposed adjacent to the proximal end (96) and a raised platform portion (182). The raised platform portion (182) is disposed adjacent to the distal end (99). The tray member (14) is sized and shaped for being received by the base member (18) such that when the case member (10) is in the open position, the disc receiving portion (98) and the raised platform (182) of the tray member (14) are accessible, and when the case member (10) is in the closed position, the disc receiving portion (98) is covered by the cover member (16), and the raised platform (182) is accessible and generally coplanar with the cover member (16).

23 Claims, 13 Drawing Sheets

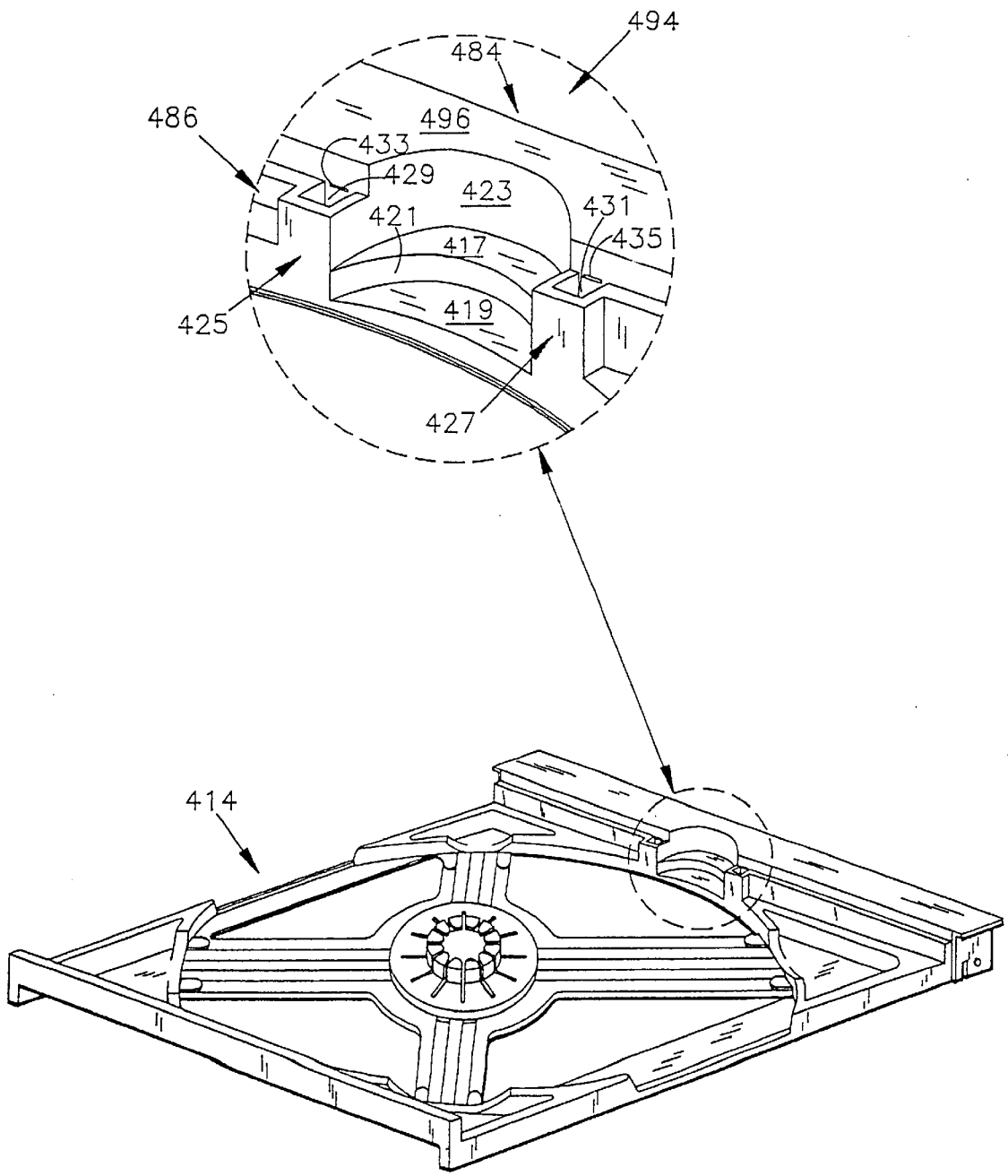

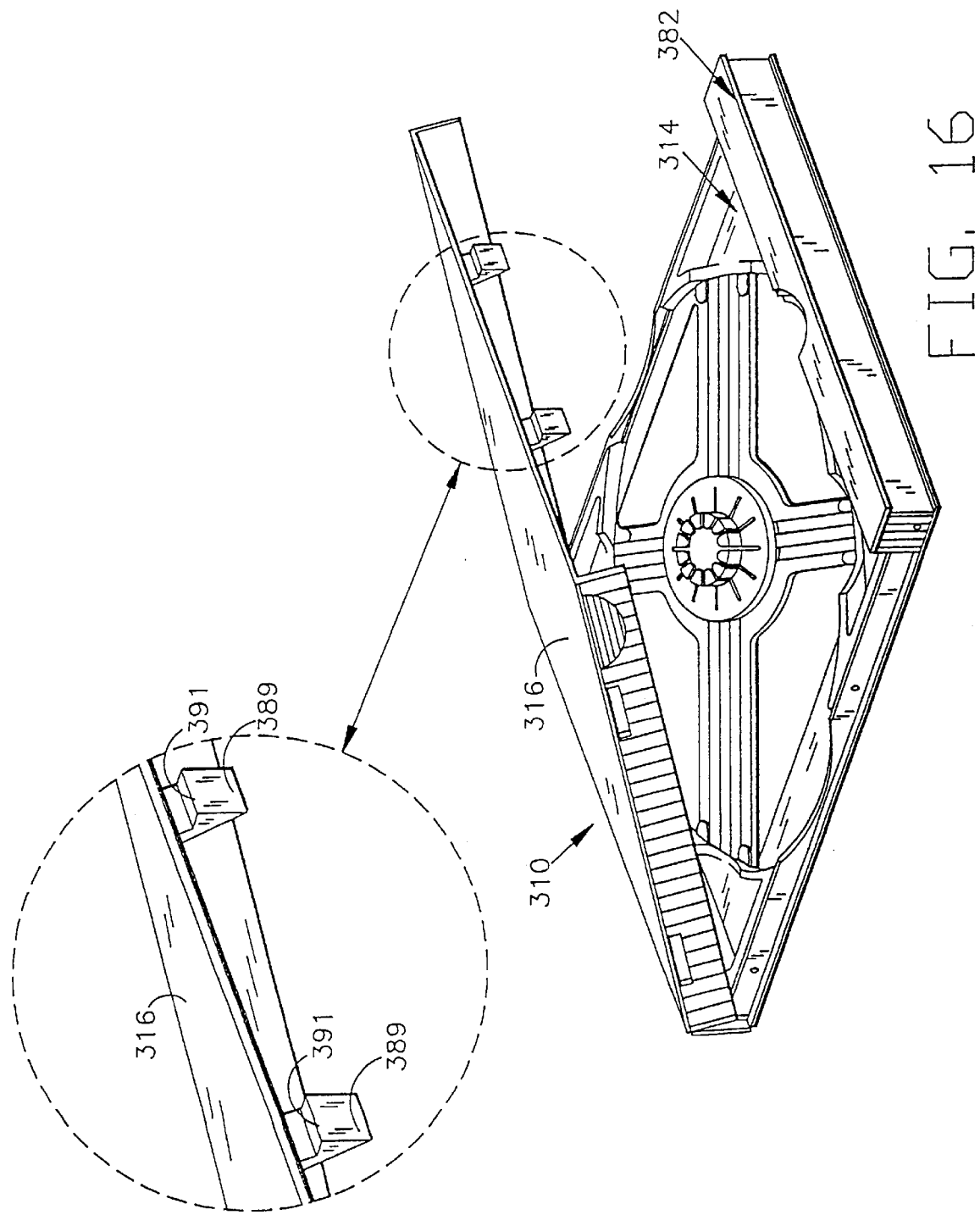

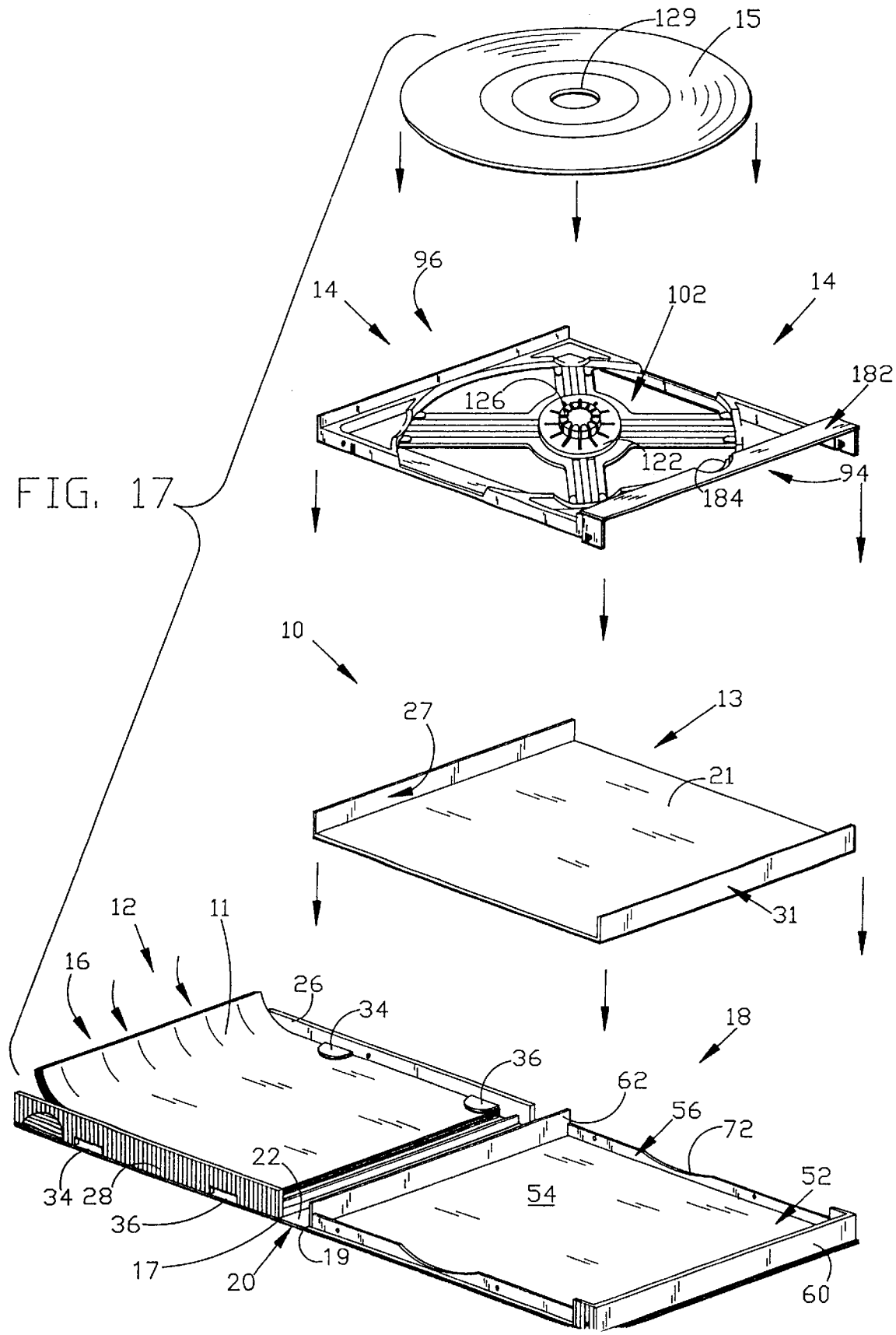

STORAGE CONTAINER FOR INFORMATION BEARING DISC DEVICES

This application claims the benefit of U.S. Provisional Application No. 60/028,833, filed Oct. 21, 1996, abandoned.

TECHNICAL FIELD OF THE INVENTION

The present invention relates to a storage container for information-bearing disc devices, and more particularly to a storage case for a compact disc type information-bearing disc, of the types used to record entertainment information, such as musical and video works; and the type used for recording computer program information, all of which are generally similar except for the information contained thereon.

BACKGROUND OF THE INVENTION

It has long been known that large amounts of information can be stored on disc-shaped storage devices, and that such devices were well suited for playback by various types of disc playing means. One example of a disc storage device is the "vinyl" records that have been in use since at least the 1930's. Another type of disc is the so-called "magnetic floppy" disc that is commonly used in connection with disc drives of computers. Although vinyl records have been used predominantly with audio playback machines, such as stereos, floppy discs have been used almost exclusively with computers.

Recently, optically readable "compact discs" (also known as "CDs" and "CD-ROMs") have been widely accepted as a format for storing information, both for audio playback, and for the storage of computer software. Currently, the computer and music industry have become standardized on a compact disc having a diameter of about 4.72 inches (12 cm.), which contains a central aperture having a diameter of about 0.590 inches (1.50 cm.). Compact discs have also found utility in digital video discs (DVD) and new high density compact discs. As the pricing difference between the various discs resides primarily in the information contained on the disc, and the manner in which the information is formatted, the present invention will have utility with all known compact discs, as the size and shape of the various compact discs is generally identical.

Although these discs are relatively inexpensive to mass produce, they are often quite expensive for the consumer to purchase because of the relatively large value of the information contained on the disc. Although the discs are not particularly fragile, the discs can be rendered unusable if the surface of the disc is scratched or marred, or a disc is otherwise chipped, cracked or broken. In order to prevent damage, it is important that a storage case be provided that will protect the disc during transportation to the consumer, and while in the possession of the consumer. Preferably, the storage case should be designed: (1) to protect the compact disc during normal use; (2) to facilitate retrieval of the compact disc from the interior of the case; (3) to be inexpensive to manufacture, so as to not add undue cost to the purchase price of the compact disc; (4) to be durable; (5) to be light weight to reduce shipping costs; and (6) to have the same outside dimensions wnen closed as the current storage cases to fit existing packaging machinery, shipping boxes, store display racks, and consumer disc storage products; and (7) to have approximately some outside dimensions when open as the current storage cases to fit in existing packaging machinery.

Several known compact disc storage cases exist, including the ones shown in Herr, et al., U.S. Pat. No. 5,445, 265; and Philosophe, U.S. Pat. No. 4,702,369. Currently the most popular type of storage case for use with an audio-containing compact disc is the so-called "jewel case" which comprises a cover member and a base member, both of which are commonly made from styrene. The cover and base are formed as two separate members, and are hingedly coupled together through a stud-and-hole arrangement. In such an arrangement, a hole is formed on each of the side panel members of the base member, and the cover is formed to include a side flange that extends generally parallel to the side panel member of the base portion. The side flange includes an integrally formed stud that is sized and positioned to be received by the side panel member.

Although the prior art storage containers discussed above no doubt perform their intended function in a workmanlike manner, room for improvement exists. For example, in an effort to maintain low cost, the most common current jewel cases are constructed in a two-piece assembly, made of styrene. This construction renders the jewel cases relatively fragile. Damage to styrene jewel cases is quite common and consumers have voiced dissatisfaction over the frequency with which these jewel cases fail. Such failures usually are due to cracking of the material of the jewel case, especially at the cover of the case and at the hinges.

Additionally, difficulties have been experienced in opening the jewel cases to gain access to a disc. Because of the shape and positioning of the cover and the hinge of these current styrene jewel cases, it is not practical to construct the cases of a more durable synthetic polymeric material, such as polypropylene or polyethylene, since such materials do not possess the rigidity required by the design of current jewel cases.

In particular, room for improvement exists in producing a durable, lightweight, inexpensive storage case that both protects the disc from destruction or mutilation, and that is also well adapted for use in connection with automated packaging machines of the type used during the manufacture and packaging of compact discs. It is pointed out that such automated packaging machines currently in use are rather elaborate and, consequently, are quite expensive. Hence, it would be highly advantageous to have available an improved storage case of the type described, and which has an overall configuration compatible with current automated packaging machines already in place in order to avoid the necessity for replacement of existing costly packaging equipment.

It is therefore one object of the present invention to provide such a device.

SUMMARY OF THE INVENTION

A storage container for a compact disc comprises a unitarily formed case member that includes a cover member, a base member, and a living hinge member for joining the cover member to the base member. The living hinge member allows the base member and cover member to pivot from a generally coplanar open position to an overlapping parallel plane closed position. A tray member is provided that has a disc receiving portion and a platform portion. The tray member is sized and shaped to be received by the base member such that the disc receiving portion is accessible when the case member is in the open position and the disc receiving portion is covered by the cover member when the case member is in the closed position. The platform portion is disposed exteriorly when the cover member is in the closed position.

Preferably, the disc receiving portion includes a central hub portion having an upwardly extending post that is sized to snuggly engage a central hole of the disc. The disc receiving portion also preferably includes a generally circular ridge member sized to define a disc receiving section of the tray member, and at least one spoke member connecting the hub portion to the generally circular ridge member. The circular ridge member, central hub portion, and at least one spoke member define a cut-out area devoid of material. Each spoke member can comprise a series of ribbed members for enhancing the structural rigidity of the tray member.

Additionally, the raised platform of the distal end of the tray member can include a recessed area on the side adjacent to the disc receiving platform that is sized and positioned for receiving a finger tip of the user for permitting an edge of the cover member to be accessed when the case member is in the closed position.

The disc storage case of the present invention has several advantages over known standard "jewel box" type storage cases. One advantage is that it offers a potentially lower production cost. Another advantage is that the disc storage can have a lighter because the more durable and more flexible material used in the disc storage case enables less material to be used. Because of this more durable construction, the disc storage case of the present invention is less likely to shatter or split than known "jewel box" type storage cases. The lower weight of the plastic box, and the lower weight of the required over-pack helps to reduce the cost of shipping the disc, and also enables the shipper to use less protective, and hence less expensive shipping packaging. Additionally, the present invention employs a living hinge arrangement that is stronger than the hinge used currently with jewel box type storage cases. The living hinge arrangement of the present invention helps to reduce damage to the jewel case during shipment and use.

Another advantage of the disc storage case of the present invention is that it is believed by the applicants to be the first living hinge containing jewel case type storage container that is capable of being run on currently used, automatic machines that insert the "U" shaped printed paper insert, the booklet, the CD and the disc tray into the jewel case. The storage case of the present invention can accommodate the same sized printed inserts and booklets as standard jewel cases. Moreover, the storage case of the present invention is compatible with current automated packaging machinery, thus enabling widespread use of the storage case of the present invention without the necessity for replacement of expensive packaging machines already in place.

One unique aspect of the design of the present invention, (when compared to other storage cases having living hinges), is that the cover of the jewel case has been shortened, thus shortening the overall length of the jewel case when opened. This feature is achieved by using a portion of the tray to serve as an outside surface of the box, so that the cover can be shortened and need not extend to the end of the base portion. Because of this shortened cover, coupled with the manner in which the cover is hinged to the base member, a generally planar surface is presented when the storage case is unfolded, so that the top cover member lies in the same plane as the base member. If the design of the storage case did not permit the case to be shorter when unfolded, the storage case probably would not be able to be used in conjunction with the popular types of automated packaging machinery.

These and other features and advantages of the present invention will become apparent to those skilled in the art upon a review of the detailed description and drawings set forth below, which disclose the best mode of practicing the present invention perceived presently by the applicants.

BRIEF DESCRIPTION OF THE DRAWINGS

FIG. 1A is a sectional view taken along lines 1A—1A of FIG. 1;

FIG. 15 is a perspective, partially enlarged view of an alternate embodiment tray member of the present invention;

FIG. 16 is a perspective, partially enlarged view of a cover member of the present invention; and FIG. 17 is an exploded view of the jewel case (with disc) of the present invention, illustrating the embodiment shown in FIG. 1.

DETAILED DESCRIPTION

Figure 1:
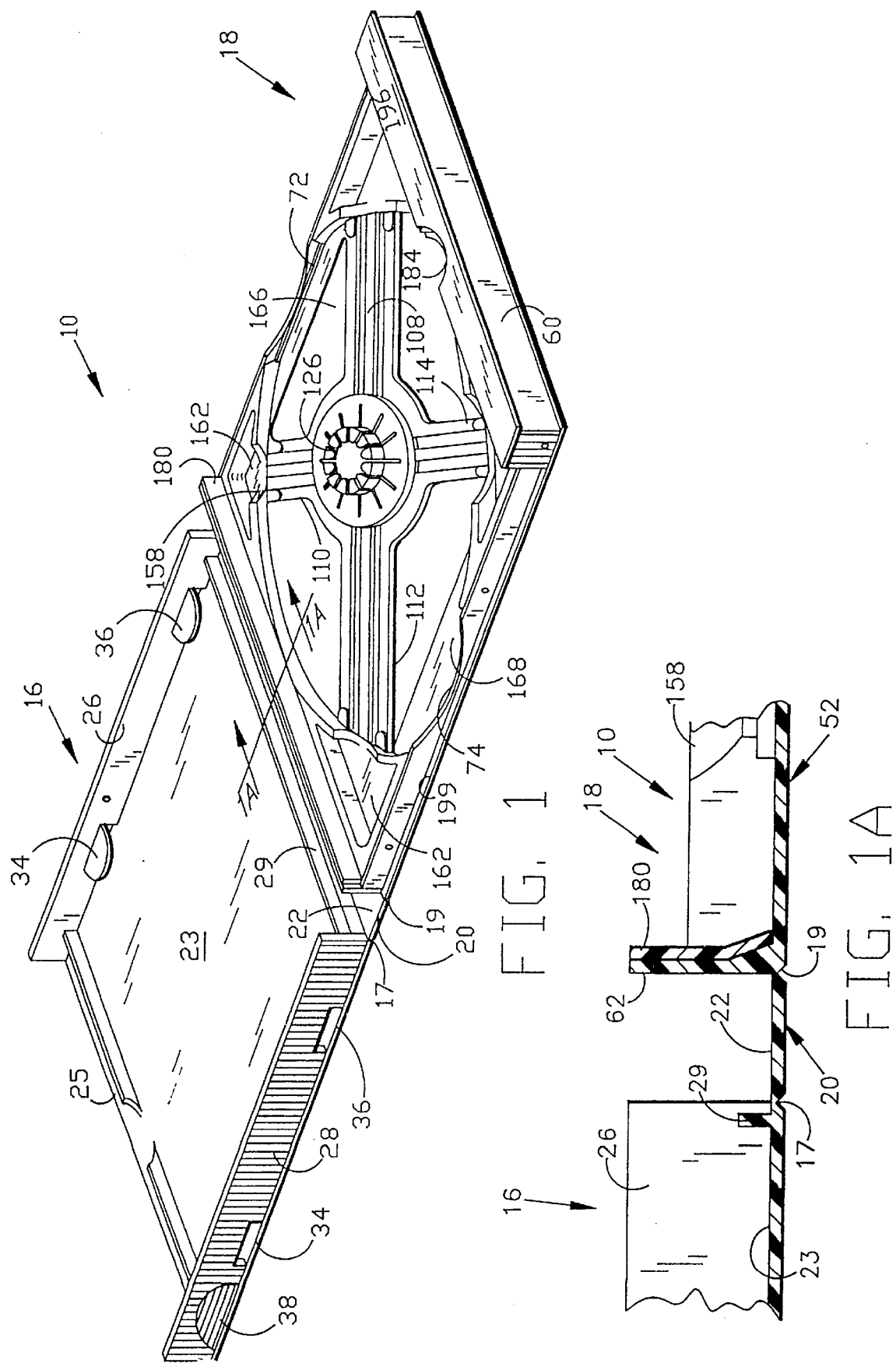
FIG. 1 is a perspective view of the disc storage case of the present invention.

The disc storage case 10 of the present invention is shown in the FIGS. 1–3B and 17 as including a unitarily formed case member 12, (best shown in FIG. 2) and a unitarily formed tray member 14, (best shown in FIG. 3), which is designed for encasing a CD-Rom type compact disc 15 (best shown in FIG. 17). The case member 12 preferably is formed of a clear, clarified polypropylene, or alternatively, polypropylene or polyethylene, although other suitable synthetic polymeric materials will become apparent to those skilled in the art. The case member 12 includes a cover member 16 and a base member 18 that are joined together by a hinge member in the form of a living hinge member 20. The cover member 16 includes a generally square, planar cover portion 24 having a planar surface 23, a length L of about 4.916 inches (12.5 cm) and a width W of about 4.875 inches (12.4 cm).

As best shown in FIG. 17, a booklet member 11 is placeable in contact with the interior planar surface 23 of the cover member 16, and under the tab members 34, 36. A U-shaped paper insert 13 having a generally rectangular main body portion 21, a spine panel portion 27, and an end panel portion 31, is placeable under the tray member 14, and therefore between the tray member 14 and the base member 18.

As best shown in FIG. 1A, the living hinge member 20 includes a pair of parallel, laterally extending score lines establishing a first living hinge 17 adjacent the cover member 16 and a second living hinge 19 adjacent to base member 18, and a spine 22 therebetween. The living hinge member 20 extends across the full width of the case.

A first panel engaging ridge member 25 extends outwardly from the planar cover 24 and extends at least partially between a first side member 26 and a second side member 28. Ridge member 25 helps to maintain the paper booklet member 11 (FIG. 17) in its proper position adjacent to inner surface 23 of the planar cover portion 24, and under tabs 34,36. A full width partial height end wall 29 extends between the first and second side walls 26, 28 adjacent to the living hinge portion 20. The end wall 29 helps to maintain the paperbook member 11 in its proper position adjacent to inner surface 23, and is sized and positioned for extending along, and resting against the second end panel 96 of the tray member 14 when the cover member 16 and base member 18 are in their engaged (closed) position.

A first side member 26 is disposed along one edge of the planer cover 24, and extends in a plane generally perpendicular to the planar cover 24. Second side member 28 is disposed in a plane generally perpendicular to the planar cover 24, and extends along another edge thereof. Each of the first and second side members 26, 28 have a length of about 5.0 inches (12.7 cm.), which is approximately the same length as the planar cover portion 24. The height of each of the first and second side members is approximately 0.38 inch (0.97 cm.). It should be noted that this measurement includes the distance imparted by the thickness of the planar cover portion 24, which itself is approximately 0.030 inches (0.762 cm.).

Each of the first and second side members 26, 28 includes a pair of inwardly extending tab members 34, 36, that are placed at a predetermined, spaced relation from the planar cover portion 24. The purpose of the tab members 34, 36 is to retain printed matter containing booklet member 11 (FIG. 17), against the planar surface 23 of the cover portion 24. Examples of printed matter booklet member 11 include instruction booklets and librettos. The distal ends of the exterior surfaces of each of the first and second side members 26, 28 include a semi-circular, ridged, finger engaging portion 38, which facilitates the opening of the disc case, by providing a non-slick finger engaging surface for the user to engage the cover portion 24.

The base member 18 of the case 12 includes a planar base portion 52 having a planar interior surface 54. The base portion 52 has a length of approximately 5.5 inches (14 cm), which is measured between the first and second end members 60, 62, and a width of approximately 4.836 inches (12.3 cm.), when measured between the first and second side members 56, 58, respectively. The first end member 60 is positioned adjacent to the edge of the base portion 52, and extends between the first and second side members 56, 58. The first end member 60 has a width of about 4.836 inches (12.3 cm.) and a height of about 0.375 inches (0.95 cm.). Second end member 62 extends between the first and second side members 56, 58 at the opposite edge of the planar base portion 52, so that it is disposed adjacent to the living hinge 20. The dimensions of the second end member 62 are generally similar to those of the first end member 60, although end member 62 is slightly shorter, being only about 0.334 inches high. As shown in FIG. 17, the U-shaped paper insert 13 is placeable between the tray 14 and the base member 18, and is positioned so that the planar main body portion 21 of the insert 13 is placeable against the planar surface 54 of the base member; the spine panel 27 is placeable against end wall 62; and the end panel 31 is placeable against end wall 60.

The first and second side members 56, 58 extend generally between the first and second end members 60, 62, and are disposed along the side edges of the planar base portion 52, and extend upwardly from the interior planar surface 54 thereof. The first and second side members are generally about 5.5 inches (14 cm.) in length and have a variable height. The first and second side members can each include a pair of spaced apertures positioned for receiving a corresponding protrusion formed on the side walls of the tray member 14. The protrusions of the tray member 14 are sized and positioned to engage the apertures of the side wall for preventing unintentional disengagement of the tray member 14 from the base member 18.

Each of the first and second side members 56, 58 can include an arcuate recessed portion 72, 74 respectively having an arcuately concave upper surface. The recessed portions serve as finger recesses to facilitate the user gripping the edge of the disc (not shown) on the tray member. Alternately, the first and second side members 56, 58 can have a constant height throughout their length. Although constant-height side members 56, 58 sacrifice the grip facilitating features provided by the recessed portions 72, 74, the use of constant height sidewalls adds rigidity to the base portion 18. This enhanced rigidity reduces the bendability of the base portion 18, and in particular, the bendability of the planar portion 52.

Each of the side members 56, 58 includes a ridged end portion 76 disposed adjacent to the first end member 60. The end portions 76 are ridged to match the appearance of the exterior surfaces of the first and second side members 26, 28 of the cover member 16.

Figure 3:
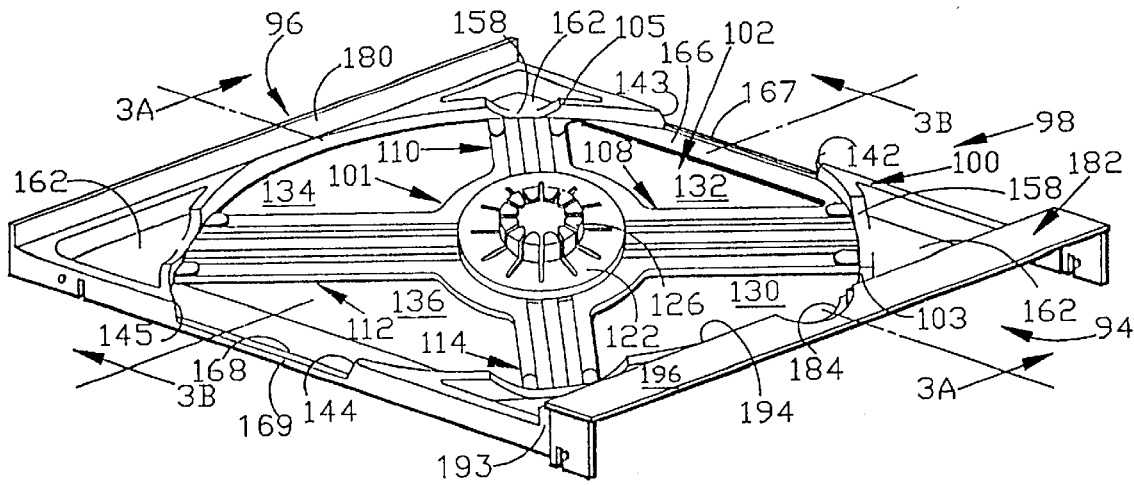
FIG. 3 is a perspective view of the tray member of the present invention.
Figure 3A:
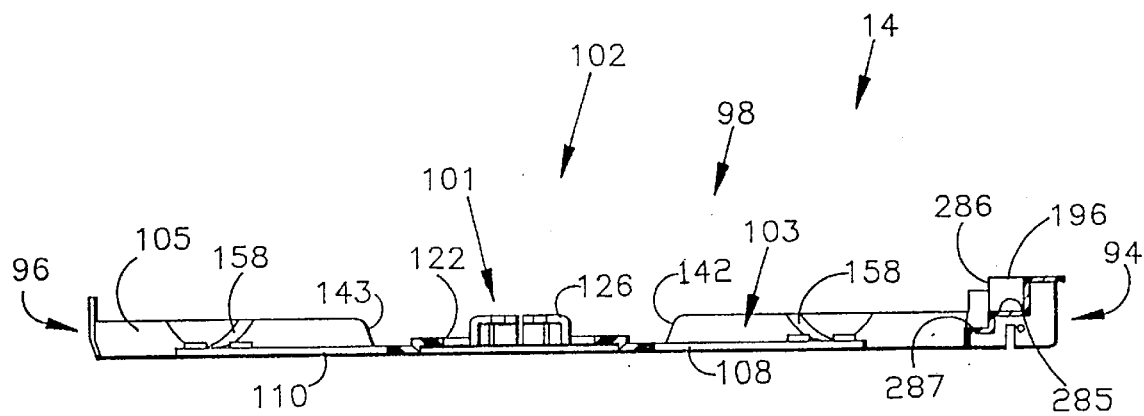
FIG. 3A is a sectional view of the tray member of FIG. 3, taken along lines 3A—3A of FIG. 3.
Figure 3B:
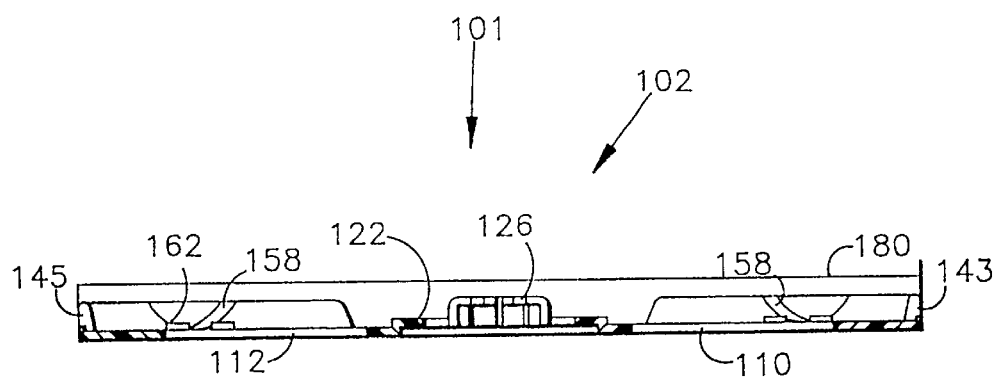
FIG. 3B is a sectional view of the tray member of FIG. 3, taken along lines 3B—3B of FIG. 3.
Figure 10:
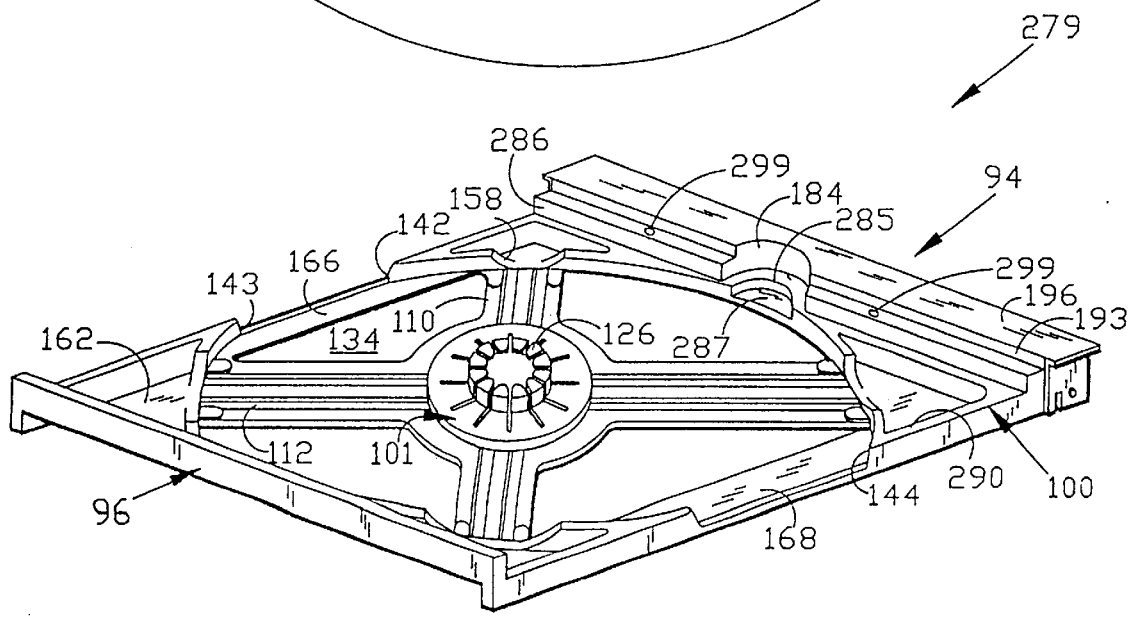
FIG. 10 is a perspective view of the tray member shown also in FIG. 3, but shown rotated 90° about a vertical axis from the view shown in FIG. 3.

The tray member 14 is best shown in FIGS. 3–3B and 10 as including a first end 94, a second end 96, and a disc receiving platform 98 disposed therebetween. The disc receiving platform 98 includes a generally circular ridge 100 comprised of a first, semi-circular ridge portion 103, and a second semi-circular ridge portion 105. The circular ridge 100, and its semi-circular ridge portions 103, 105 define a circular, disc-sized disc receiving portion 102.

The disc receiving portion 102 includes a central hub 101, and four spoke members for connecting the central hub 101 to the generally circular ridge 100. The spoke members include first spoke member 108, second spoke member 110, third spoke member 112, and fourth spoke member 114. Each of the four spoke members 108–114 have a "corrugated" structure that includes a series of radially extending ridges for providing structural rigidity. The radially extending ridges are shown in the drawings as including three upwardly extending ridges and two recessed ridges, one disposed between each of the raised ridges so that ribs exist on both the bottom and top surface of the spokes. The hub 101 includes a washer-shaped platform portion 122. A circular array of upstanding finger-like, projections define a spline member 126 disposed at the center of the washer-shaped platform portion 122. The outer diameter of the spline member 126 should be designed to be snuggly received by the center hole 129 (FIG. 17) of the compact disc 15.

The washer shaped platform portion is designed to support the disc 15, along with the radially outer portions of the spokes 108–114. Contact between the underside surface of the disc 15 and the upper surface of the spokes 108–114 is minimized to reduce the chance that the spokes will mar the information containing underside surface of the disc 15.

The hub 101, spokes 108, 110, 112, 114, and semi-circular ridge portions 103, 105 define a series of four cutout portions, including first cutout portion 130, second cutout portion 132, third cutout portion 134, and fourth cutout portion 136. First cutout portion 130 is disposed between the fourth 114 and first 108 spokes; the second cutout portion 132 is disposed between the first 108 and second 110 spokes; the third cutout portion 134 is disposed between the second 110 and third 112 spokes; and the fourth cutout portion 136 is disposed between the third 112 and fourth 114 spokes. These cutout portions 130, 132, 134, 136 comprise "holes" in the tray which are devoid of material. By doing this, the material costs and weight of the tray 14 can be reduced substantially. By reducing the weight of the tray (along with the weight of the entire device) the shipping costs of the cases can be reduced, especially when the cases are shipped in large quantities.

As will be noted, the circular ridge 100 includes a first side recessed portion which is defined as that portion of the circular ridge between the end portions 142, 143 of the semi-circular ridge portions 103, 105. A second side recessed portion is formed in the area between the end portions 144, 145 of the first and second semi-circular ridge portions 103, 105. A generally planar side stiffening member 166, 168 is disposed in this area and extends between and connects the semi-circular ridge portions 103, 105 to provide structural rigidity for the tray 14. Preferably, each of the side stiffening members includes an upwardly extending stiffening flange, 167, 169, respectively.

The two corner portions of the two semi-circular ridge members 103, 105 each include a recessed portion 158 which is disposed adjacent to the end of each of the four spokes 108, 110, 112, 114. These recessed portions 158 each include an arcuately concave upper surface, and are provided for enabling the user to engage a side edge of the compact disc that is placed on the tray, to better dislodge the compact disc from the tray, and in particular dislodge the engagement between the center hole of the disc and upstanding spline member 126. Additionally, four, generally triangular recessed portions 162 are disposed in each of the corners of the tray 14, in the area generally radially outwardly from the ends of the spoke portions 108, 110, 112, 114. The recessed portions 162 could be "cut-outs" that are devoid of material, but preferably are not, and are about 0.030 inches (0.0762 cm.) thick to provide additional structural rigidity.

Circular ridge 100, spline 126 and spokes 108, 110, 112, 114 are sized and positioned for receiving a compact disc thereon and maintaining the compact disc on the tray 14 through the engagement of the spline members 126 with the center hole of the disc.

Figure 5:
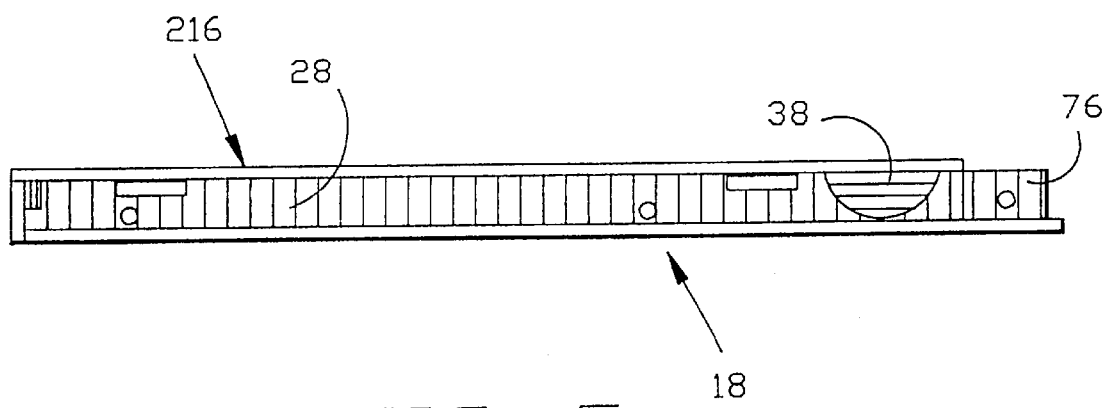
FIG. 5 is a side view of the storage case of the embodiment of FIG. 6, showing the cover member in its closed position, engaged with the base member.

The tray 14 also includes a second end member upstanding panel 180 which has a width of approximately 4.75 inches (12.1 cm.) and height of approximately 0.315 inches (0.8 cm.). The first end 94 includes a platform 182 having a width of approximately 4.9 inches (12.4 cm.), and a depth of approximately 0.43 inches (1.09 cm.). The platform 182 includes a quarter-spherical shaped central finger recess portion 184 for enabling the user to disengage the top cover member 16 from its engagement with the base member 18, when the top cover member 16 is placed in a position to overlay the base member 18, and engage as shown in FIG. 5.

The tray 14 is placed on the planar surface 54 of the base member 18, so that it is entirely contained within the first and second side members 56, 58, and first and second end members 60, 62, except for the upper surface 196 of the platform 182 that over hangs first end panel 60, and a portion of the ridged portions 76 of the first and second side members 56, 58. The first end platform member 182 is disposed adjacent to the first end member 60 of the base 18, and the second end member 180 is disposed adjacent to the second end member 62 of the base 18. The paper insert 13 is disposed between the tray member 14 and the base member 18.

Turning now to FIG. 10, tray member 14, your attention is directed to the manner in which the area adjacent to the finger recess portion 184 is formed.

Finger recess portion 184 is formed adjacent to the first end 194 of the tray. The finger recess portion 184 extends both through the raised platform 182 and a reinforcing wall 286 which extends across width of the tray 14, which is formed as part of the first wall 193. The finger recess portion 184 also includes a base surface 287 and an upper step 285 that is slightly elevated above the base surface 287, the level of the upper step 285 being the same as the level of the upper surface of the circular ridge 100. It has been found by applicants that through this configuration, more structural rigidity is imparted to the tray 14.

Tray 14 can also include a mechanical securing means for helping to secure the cover member 16 into engagement with the tray 14, and hence the base member 18 when the cover member 16 is closed. In FIG. 10, the securing means is shown as a pair of apertures 299, which are formed in the reinforcing wall 286. The apertures 299 are sized and positioned for receiving a pair of mating projections, such as mating projection 289 that are formed on the cover member 216, of the embodiment shown in FIG. 8. It will be appreciated however, that the projections 289 can be formed on the tray 14, and the apertures 299 on the cover portion 16, and that other types of securing means can be employed. Alternatively, the tray 14 can be made from a different material from the box, such as a relatively stiffer polypropylene or a styrene.

Turning now to FIG. 16, a storage case 310 is shown that includes a cover portion 316 having a pair of spaced, half-arrowhead shaped (in cross-section) mating projections 389 that are sized and positioned for being received by rectangular apertures (not shown) in the platform portion 382 of the tray 314. The mating projections each include a protruding lip 391 for helping the projections maintain their engagement with the apertures (not shown).

Returning back to FIGS. 1, 3–3B and 10, the height of the tray 14 is selected so that the top cover member 16 can overlay most of the base member 18, with the edges of the first and second side members 26, 28 engaging the upwardly facing side edge surface 199 of the base 18. The tray 14 is also configured so that a standard "U" shaped paper insert can be inserted between the underside of the tray 14 and the planar surface 54 of the base portion. The "side legs" of the paper insert are sized to extend along, and be placed against the inside surfaces of the first and second end member 60, 62. Typically, the paper tray card insert 13 has two small end panels including the spine panel 27 (often referred to as the "spine copy") and the end panel 31 (often referred to as the back panel), each of which are printed with material relating to the particular disc.

The upper surface 196 of the platform 182 of the tray 14 is sized and positioned, so that when the case is closed, the cover member 16 overlays the base member 18; and the second panel engaging member 29 engages, and receives the upper edge of the second end panel 62 of the base member 18 so that the cover member 16 overlays the second end panel 180 and disc receiving platform 98. Additionally, the cover member 16 abuts the edge of the side surface 194 and is generally co-planar with the platform 182. The entire upper surface 196 of the first end platform 182 is exteriorly exposed, along with the finger receiving recessed portion 184, so that the user can open the case 10 by disengaging the cover member 16 from the base member 18 by placing his finger in finger recess 184, and prying the cover member 16 upwardly, so that the mating projections (e.g. 289, FIG. 8) become disengaged from their respective apertures 299 (FIG. 10). It should also be noted that the finger recess portion 184 is a two step design, including an upper step 285, and a lower step 287, that is designed so that when the cover is closed, the upper step 285 provides a means for grasping the cover 16 to open it, while not giving access to the disc that is contained within the case. Only after the cover 16 is opened, is the lower section (e.g. lower step 287 in FIG. 10, lower step and wall 419, 421 in FIG. 15) accessible to permit one to grasp the disc for removal from the platform.

Figure 2:
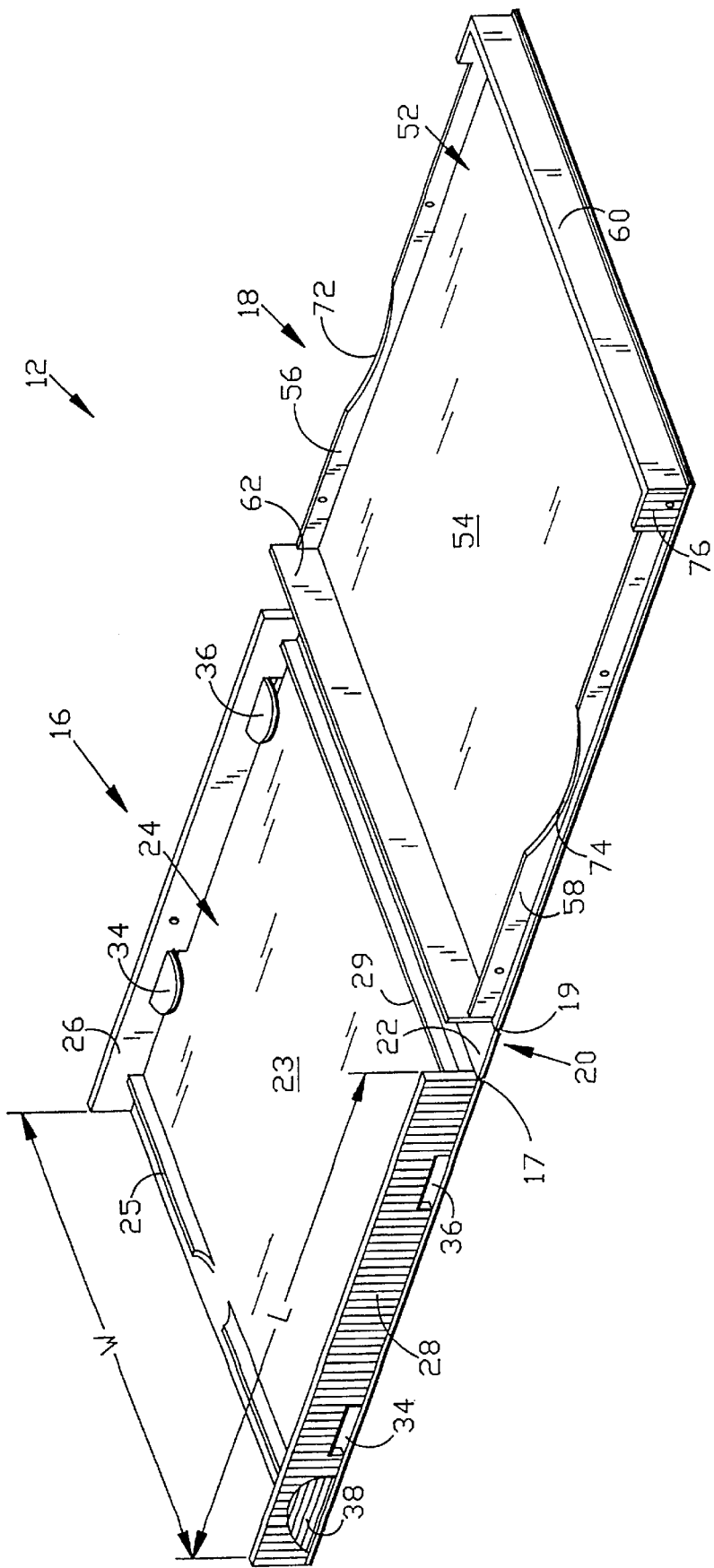
FIG. 2 is a perspective view of the case member of the present invention.
Figure 4:
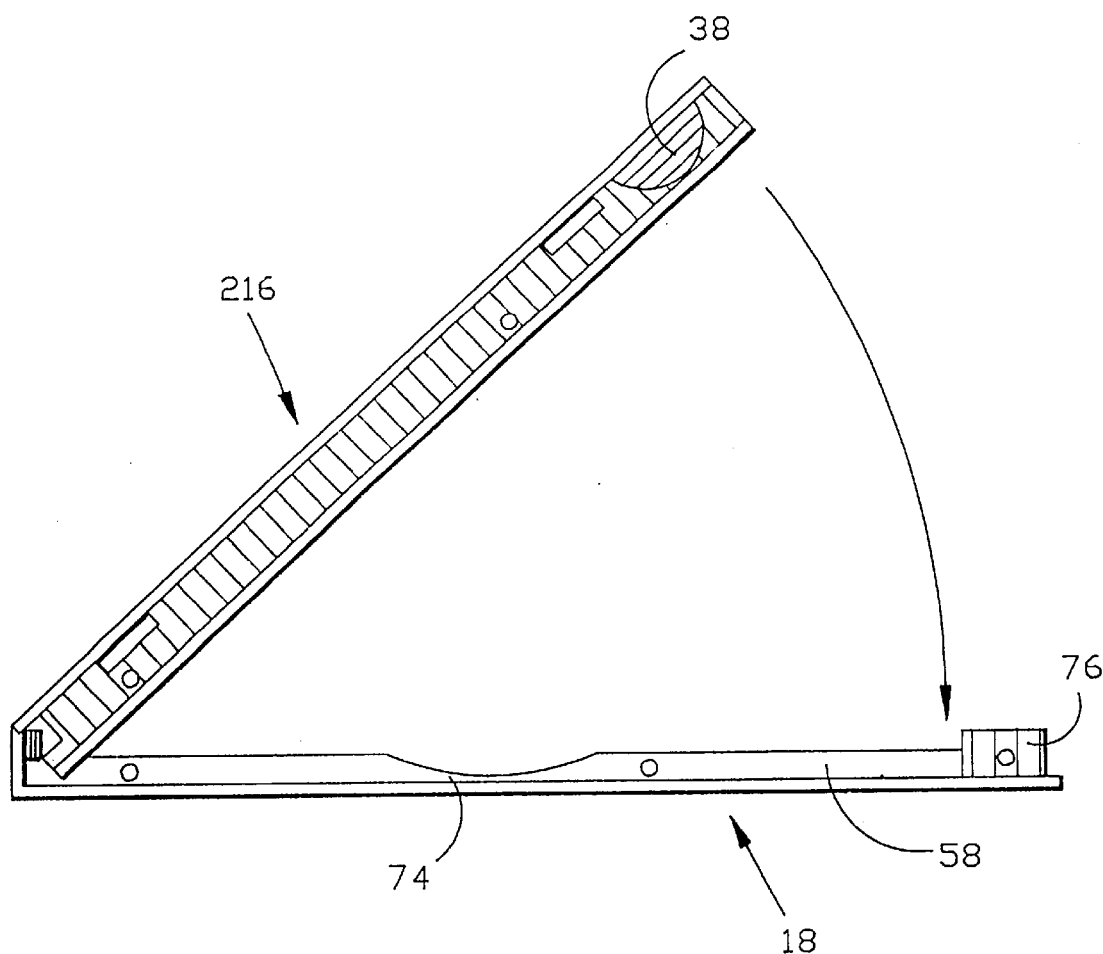
FIG. 4 is a side view of the storage case of the embodiment of FIG. 6, showing the cover member in its hinged movement toward engagement with the base member.

When so disengaged, the cover member 16 moves into its open position, as shown in FIGS. 1, 2 and 4, facilitated by the living hinges 17 and 19. The friction for maintaining the cover member 16 and base member 18 engaged in their closed positions is provided by the relationship between the protrusions and recesses in the respective side panel member 26, 56 and 28, 58 of the base 18 and cover 16 members, and the engagement of the mating projections (e.g. 289) with the apertures 299.

The finger grips 38 are provided as another vehicle, in addition to finger recess 184, for enabling the user to open the case. The finger grips 38 are useful because they are similar to the finger grips that exist on currently used storage cases. When the storage case 10 is in its open position, the disc is exposed on the disc receiving platform 98, so that the user can disengage the compact disc from the disc receiving platform 98, by inserting his/her finger in the finger recess portion 184 (FIG. 3) of the tray platform 182, or alternately, by inserting his/her fingers in one or more of the recessed portions 158 of the tray 14, to dislodge the disc from the disc receiving platform 98 by pulling the center hole of the disc from its engagement with the central spline 126. Turning now to FIG. 15, the finger recess portion into which the user inserts his or her finger is that area that includes, and is contiguous to the areas designated generally by surface 419 and wall 421.

Referring now to FIGS. 4, 5, 6–9 and 11–14, an alternate embodiment disc case 210 is shown. Disc case 210 is generally similar, in most respects, to disc case 10 shown in FIGS. 1, 2 and 17. As such, those parts of disc case 210 that are identical to disc case 10 are labeled with the same numbers (10–199) as are their corresponding parts used in connection with disc case 10. However, those components of disc case 210 which are different are indicated with different numbers (200–300).

In the following description, only those components that are different will be discussed. For components that are identical between disc case 210 and disc case 10, the explanation given in connection with disc case 10 is hereby incorporated by reference.

The primary difference between disc case 210 and disc case 10 resides in a spine lock system which is formed as part of living hinge member 220 of disc case 210. Disc case 210 includes a slightly different cover member 216, a rather different living hinge member 220, and a generally identical base member 18.

Cover member 216 includes a first side member 226 and a second side member 228, each of which are disposed along the respective sides of the cover member 216, and which extend in a plane generally perpendicular to the planar cover portion 24. The planar cover portion 24 has a generally planar surface 23, which extends between the first and second side members 226, 228. The majority of the first and second side members 226, 228 is generally identical to the first and second members 26, 28 of the embodiment of FIG. 1.

Figure 7:
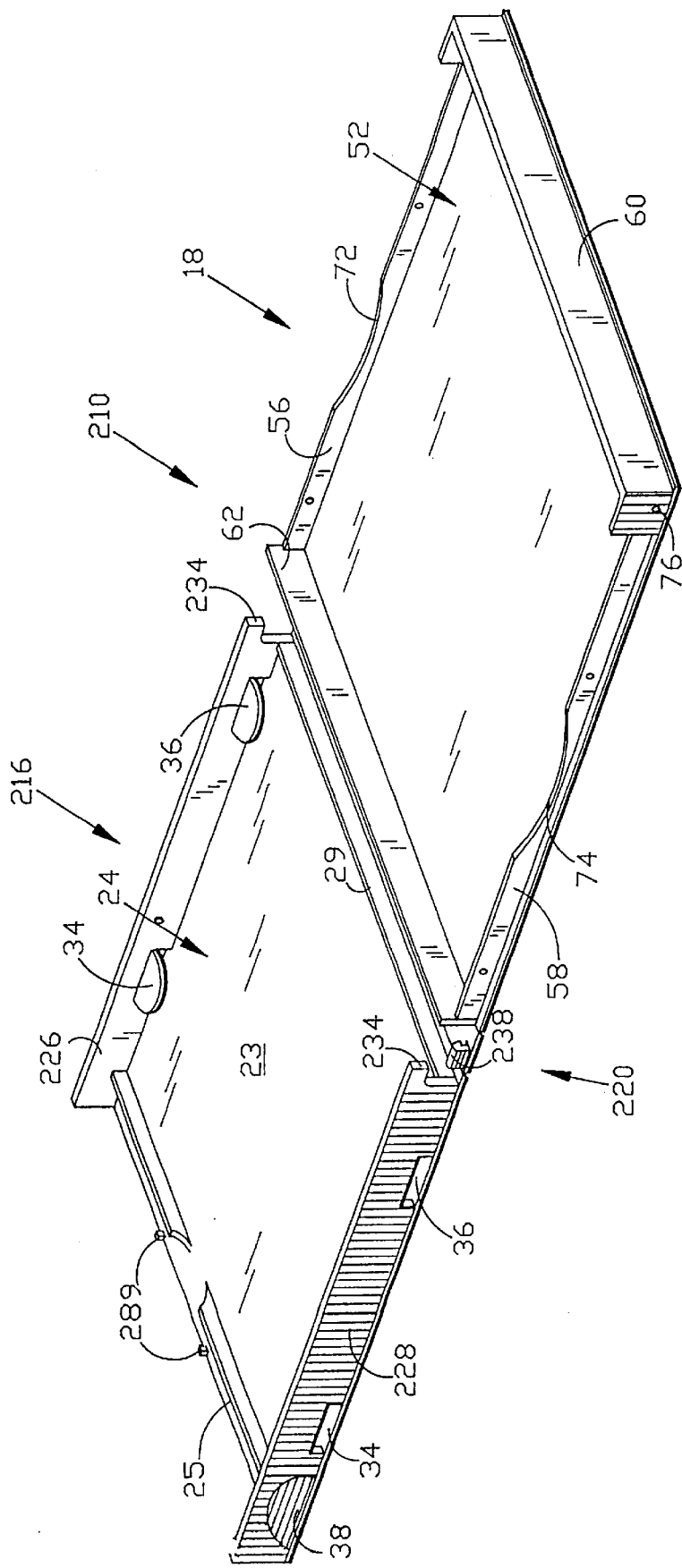
FIG. 7 is a perspective view of the case member of the disc case of FIG. 6.
Figure 9:
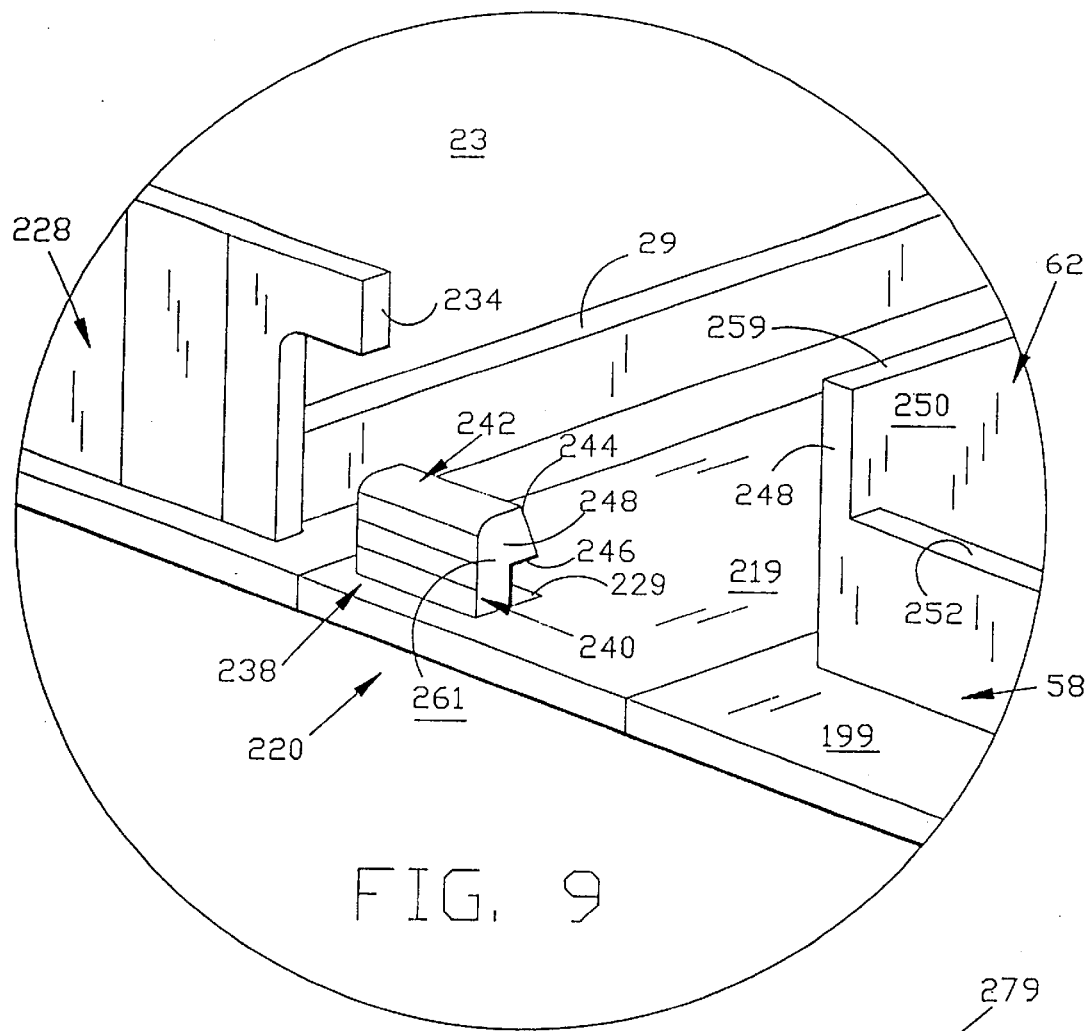
FIG. 9 is an enlarged, fragmentary view of the spine lock mechanism of the disc case of FIG. 6.

As best shown in FIGS. 7 and 9, the ends of the first and second side members 226, 228 that are closest to living hinge 220, a finger portion 234, which is formed by a portion of the side members 226, 228 of the cover member 216 being cut away. The finger portion 234 is formed adjacent to the top of the respective first and second side members 226, 228.

The living hinge member 220 is formed to have approximately the same length as living hinge member 20 of FIG. 1. Similar to living hinge member 20, living hinge member 220 is unitarily formed to extend all the way across the width of the disc case 210. As such, the living hinge member 220 has a width of about 4.875 inches (12.4 cm) and a length of about 0.4 inches (1 cm).

An upstanding spine lock member 238 is formed on the living hinge member 220. Two spine lock members 238 are employed on the disc case 210, with a first one (not shown) being disposed on the living hinge member 220 adjacent to the first side member 226 and a second one 238 being disposed adjacent to the second side member 228. The upstanding spine lock member 238 includes an upstanding portion 240, having a height of about 0.070 inches (0.1778 cm) (when measured from the upper surface 219 of the living hinge member), and a generally laterally extending hook portion 242 which has a full lateral extent of about 0.085 inches (0.0216 cm). The distal end of the hook portion 242 includes a beveled surface 244 which, as shown in FIG. 9, is beveled at about a 15° angle from vertical. The hook portion also includes a latching surface 246 which is disposed on the underside of the hook portion 242.

When so configured, the spine lock member 238 creates a gap of approximately 0.040 inches (0.1016 cm) between the latching surface 246 and the upper surface of the living hinge member 220, and a width of approximately 0.055 inches (0.14 cm) when measured between the inner side surface of the upstanding portion 240, and an imaginary vertical line/plane M which is disposed adjacent to the tip of the beveled portion 244. The spine lock 238 is sized and positioned so that the gap that is formed between the underside surface 246 of the hook portion 242 and the upper surface of the living hinge member 220 will engage the second end wall 62 of the base portion 18, and so that the first end surface 261 of the spine lock 238 will be disposed adjacent to the upper surface 252 of second side member 58, and the second end surface (not shown) of the spine lock 238 will be disposed generally flush with the upper surface 259 of the second end member 62 of the base portion 18.

The spine lock 238 engages second end wall 62, when the disc case is closed, as shown in FIGS. 11–14. When the cover member 216 is rotated in a direction shown by the arrows to a position (shown in FIG. 12) wherein the living hinge member 220 is disposed generally perpendicular to the base member 18, the spine lock 238 will engage the second end wall 62. Prior to the engagement of the spine lock 238 with second end wall 62, the beveled surface 244 is forced against the side surface 248 of the second end wall 62. As the cover member 216 is moved further into engagement, the beveled surface 244 slides over the end surface 248, and the spine lock 238 springs inwardly so that the underside surface 246 of the hook portion 240 engages surface 250 of end wall 62.

When the spine lock 240 is engaged with the second end wall 62, the first end surface 261 is placed adjacent to the upper surface 252 of the second side member 58, and the first end surface (not shown) is generally flush to the top surface 259 of the second end wall 62. Additionally, the inside surface of the upstanding portion 238 engages the side surface 248 of the second end wall 62. The spine lock 238 is designed to have both resiliency, so that it can bow outwardly as the beveled surface 244 is being pushed across surface 248, and also have memory so that the spine lock 238 springs inwardly to enable the underside surface 246 of the hook portion 242 to engage surface 250.

Preferably, a hole 229 is formed in the living hinge member 220 directly under the underside surface 246 of the hook portion 242 of the spine lock 238. This hole is provided to facilitate molding, so that a portion of the mold can extend through the hole 229 to help form the underside surface 246 and inside of the spine lock member 238 without the need for using a "cam" in the mold. However, it may also be desirable not to employ hole 229, but rather to leave living hinge member 220 solid and to use a cam in the mold, if additional structural rigidity is found to be necessary.

Figure 6:
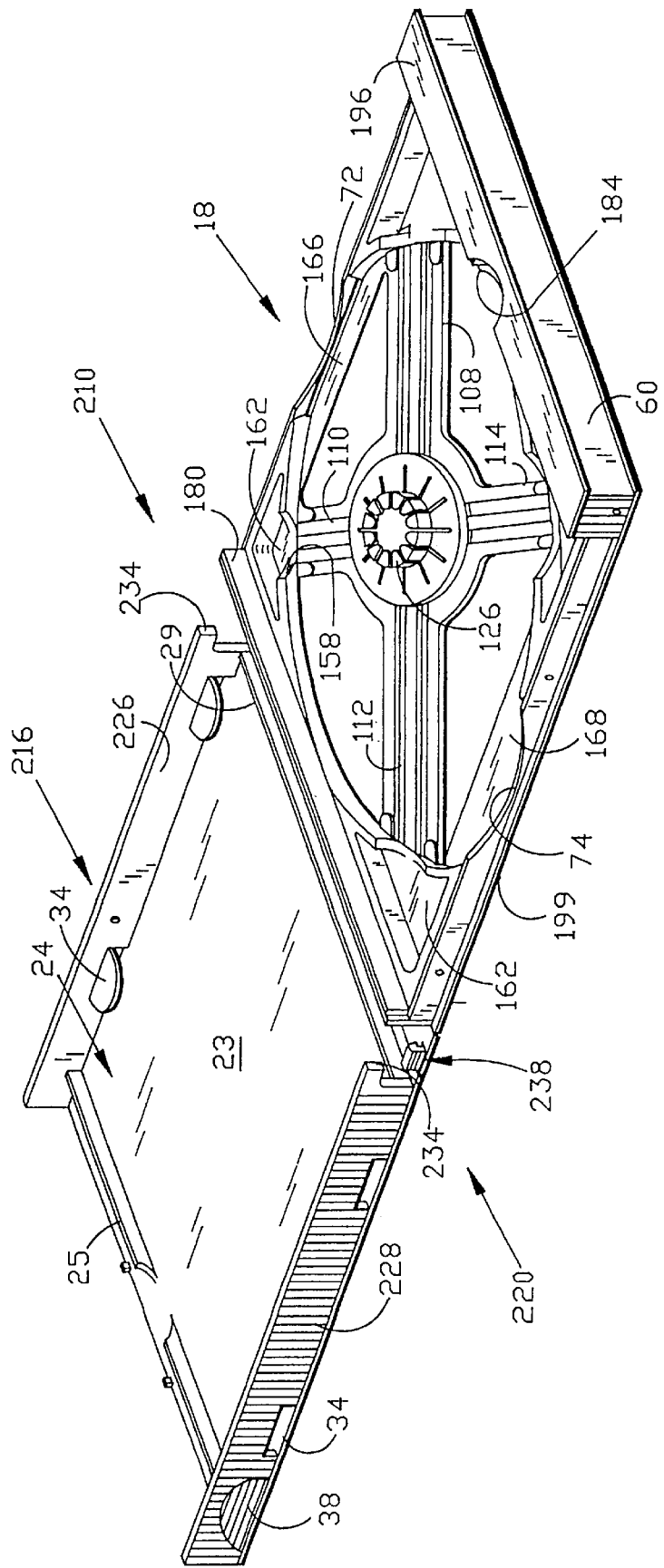
FIG. 6 is a perspective view of an alternate embodiment disc case of the present invention that contains a spine lock.
Figure 8:
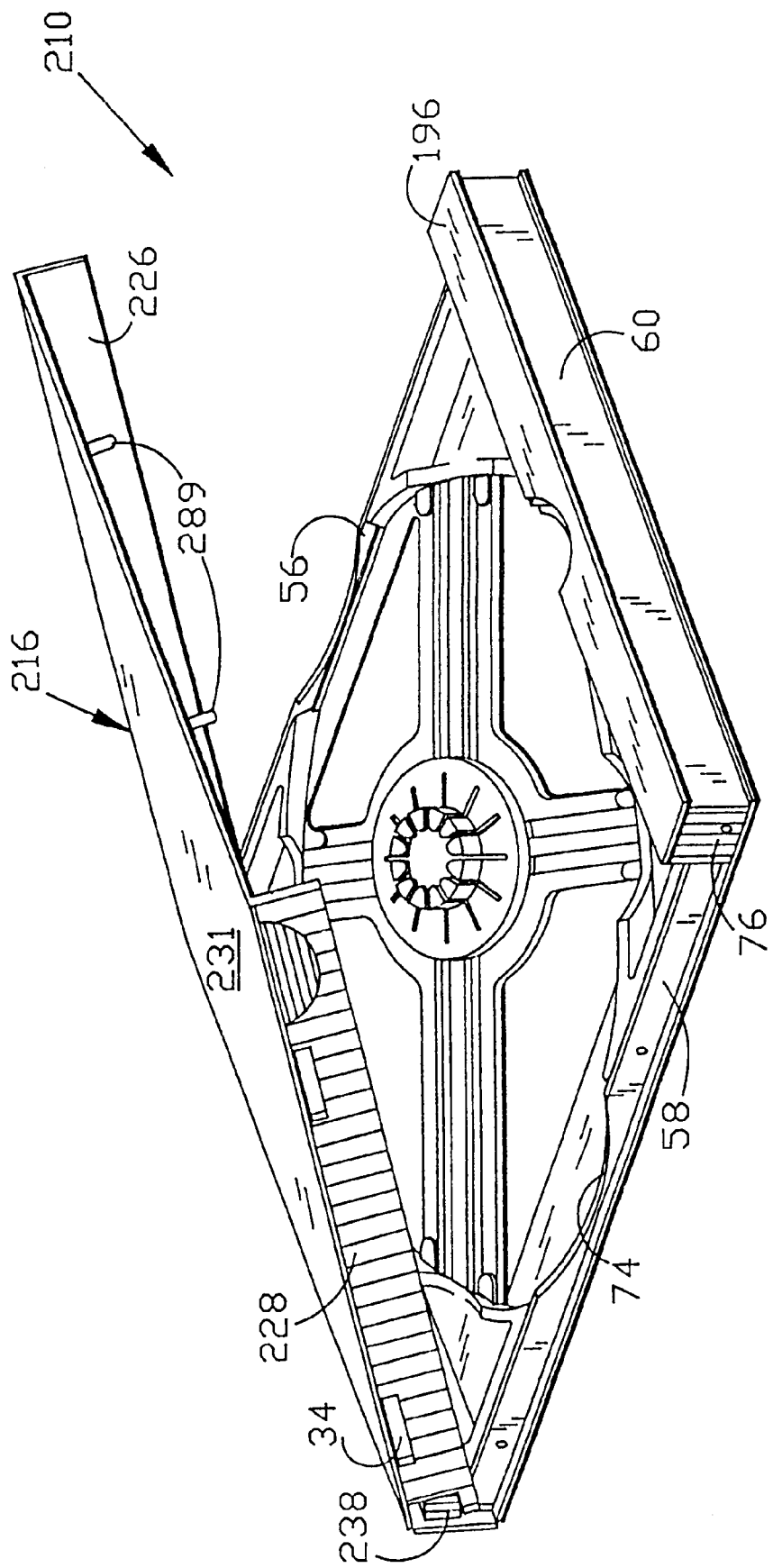
FIG. 8 is a perspective view of the disc case of FIG. 6 showing in the cover member in a partially closed position.
Figure 13:
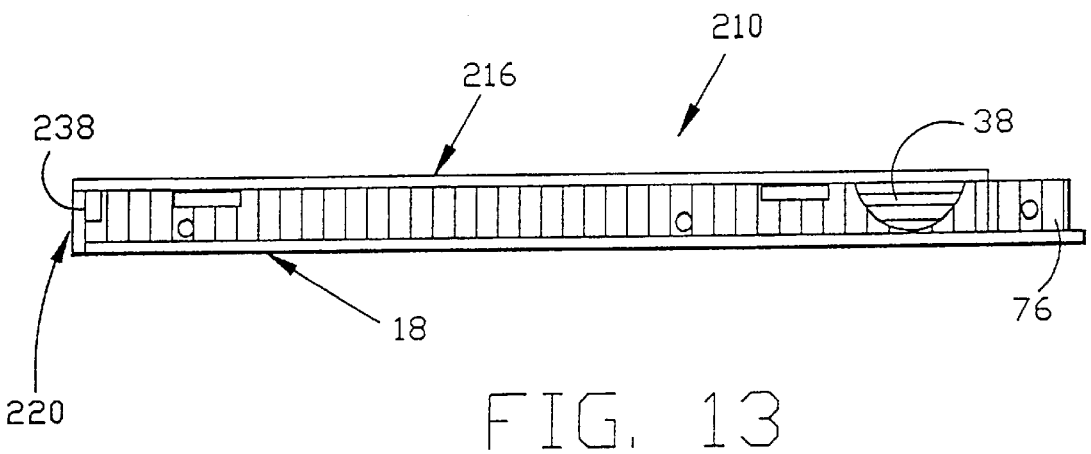

Another view of the disc case 210 in its partially closed position is shown in FIG. 8. In particular FIG. 8 is instructive because it shows the top surface 231 of the cover member 216. In use, the disc case 210 will generally only assume its completely planar position, as shown in FIGS. 6 and 7, during the time when the disc (not shown) and printed materials are being loaded into the disc case 210. Prior to shipment, the disc case 210 will be folded into its closed position as shown in FIG. 13, shows the case in the closed position wherein the cover portion 216 overlays the base portion 18, although it does not show a tray 14 inserted in the case 210, as would almost always be the circumstance when the case was shipped. When the disc case 210 is subsequently opened by a user, the spine lock 238 will normally remain engaged with the second end wall 62, unless for some reason, the user decides to disengage the spine lock 238 from the second end wall 62. Such disengagement can be effected by pushing outwardly on the beveled surface 244, to disengage the underside surface 246 from surface 250 of the second end wall 62.

Although the other spine locking member disposed on the other end of the living hinge member 220 is not shown or described, it will be appreciated that it acts generally identical to the spine lock member 238 described above.

Figure 11:
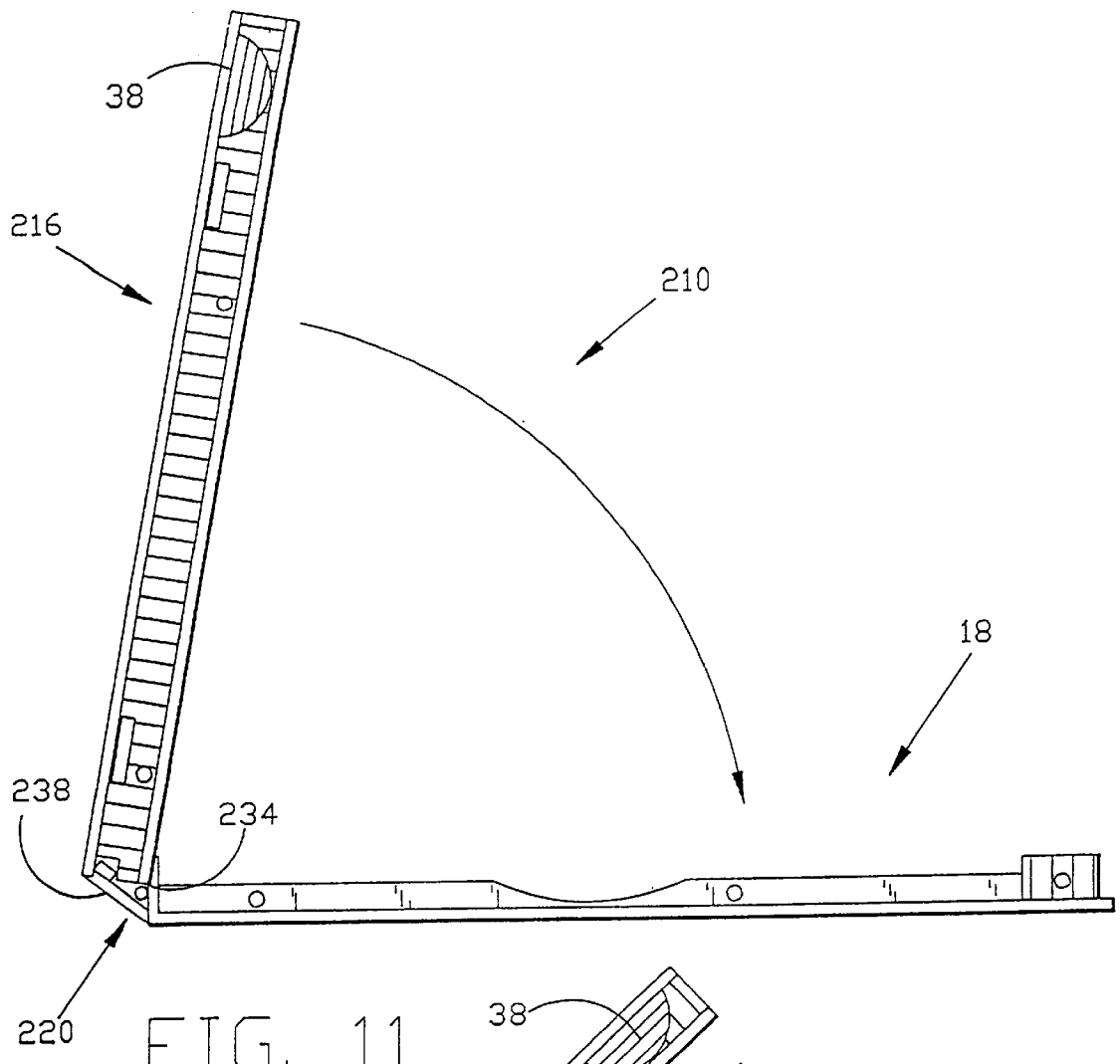
FIGS. 11–14 are sequential views showing the opening and closing of the disc case of FIG. 6.
Figure 12:
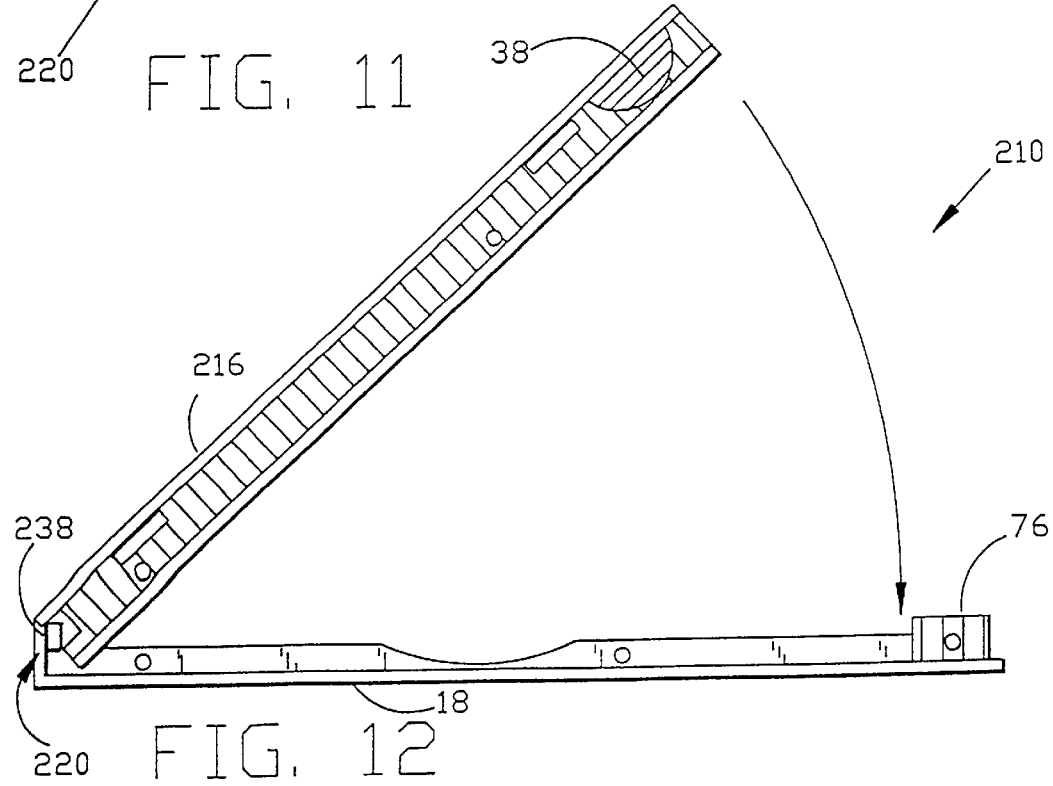
Figure 14:
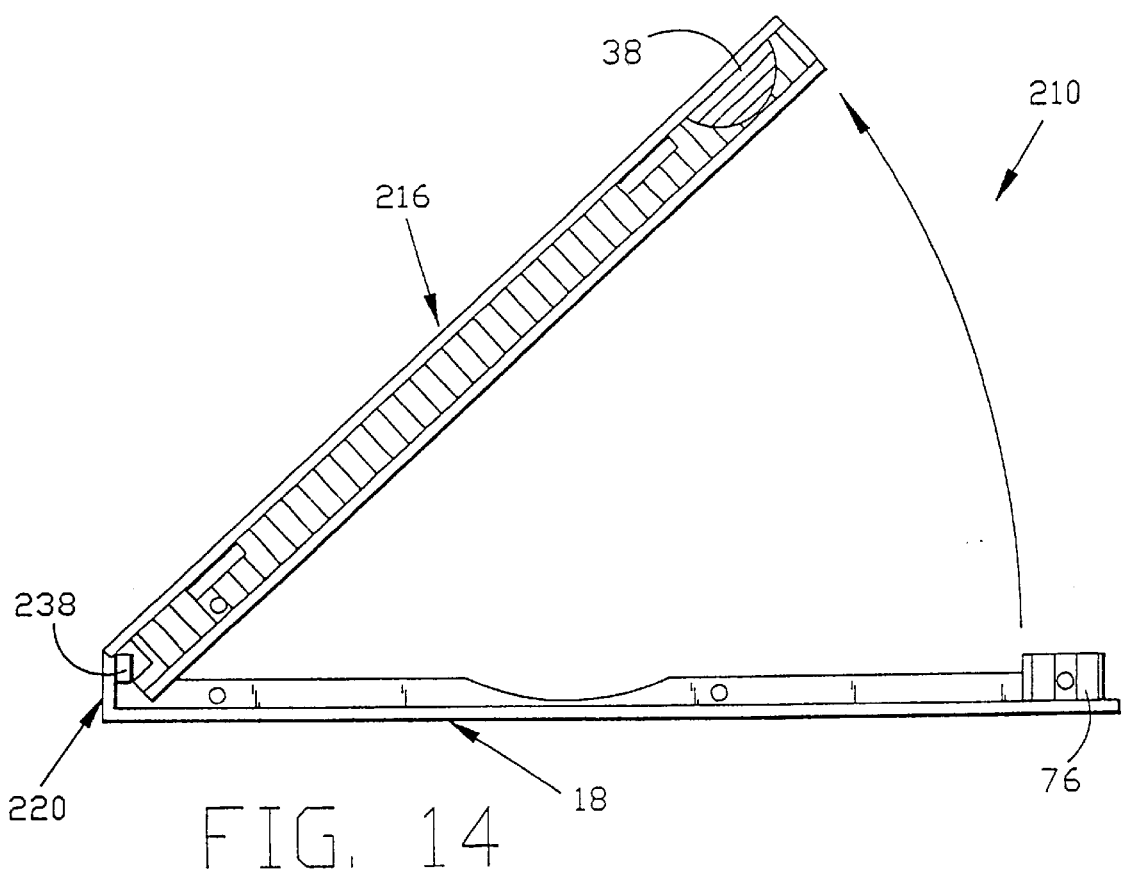

Turning now to FIGS. 11–14, the operation of the device will be described. In FIG. 11, the device is shown prior to its first closure, but is shown in the process of being closed for the first time. In FIG. 11, it will be noted that the living hinge member 220 is disposed at an acute angle to the surface on which the base member 18 rests, and the spine lock member 238 is not yet engaged with the second end wall 62. In FIG. 12, the living hinge member 220 is moved to a position where it extends in a plane generally perpendicular to the plane of the base member 18, thus engaging the spine lock member 238 with the second end wall 62. FIG. 13 shows the case in its closed position, wherein the base member 18 and cover member 216 are disposed in a generally parallel plane, with the cover member 216 overlaying the base member 18. FIG. 14 shows the cover member 216 being subsequently opened. It will be noted that upon this opening, the living hinge member 220 still remains perpendicular to the base member 18, thus indicating that the spine lock 238 remains engaged with the second end wall 62 of the base member 18.

Referring now to FIG. 15, an alternate embodiment tray member 414 is shown. Tray 414 is generally similar to tray 14 (FIG. 1), except that finger recess portion 484 is formed adjacent to the second end 494 of the tray member 414. The finger recess portion 484 extends through the second end raised portion 496, and includes a first level defined by upwardly facing surface 417, and a second level defined by a second upwardly facing surface 419. A vertically extending wall 421 is disposed between the second and third levels 417, 419. Similarly, a taller, vertically extending wall 423 extends between the second level 417, and the upper level 496.

One of the primary differences in the embodiment shown in FIG. 15 is that reinforcing wall 486 includes a pair of column-like members 425, 427 that are disposed on either side of the finger recess portion 484. The column members 425, 427 comprise three dimensional rectangular objects having hollow centers, 429, 431 respectively. The hollow, center portions 429, 431 actually comprise rectangular tubes that are sized and positioned for receiving mating projections, such as mating projections 389, shown in FIG. 16. The rectangular hollow areas 429, 431 can include ridge members 433, 435 formed on the walls for frictionally engaging the outwardly protruding lips, 391 of mating projections 389 (FIG. 16). However, it should be noted that the column members can have a cross-sectional shape (e.g. circular, oval, pentagonal) other than rectangular. Additionally, means other than the ridge members 433, 435 can be employed to create a frictional engagement between the mating projections and hollow areas.

What is claimed is:

1. A storage container for a disc comprising:

a case member, including a cover member, a base member, and a hinge member for joining the cover member to the base member, the hinge member allowing the base member and cover member to pivot from a coplanar open position to an overlapping parallel plane closed position, the cover member having a proximal end and a distal end, the proximal end of the cover member being adjacent to the hinge member, and a tray member coupled to the base member, the tray member having a proximal end and a distal end, the proximal end of the tray member being adjacent to the hinge member, the tray member including a disc receiving portion disposed adjacent to the proximal end of the tray member, and a raised platform portion disposed adjacent to the distal end of the tray member, the tray member being sized and shaped for being received by the base member such that when the case member is in the open position the disc receiving portion and the raised platform portion of the tray member are disposed exteriorly of the case member, and when the case member is in the closed position the disc receiving portion of the tray member is covered by the cover member and the raised platform portion of the tray member is disposed exteriorly of the case member adjacent to the distal end of the cover member and is generally coplanar with the cover member.

2. The storage container of claim 1 wherein the disc receiving portion includes a central hub portion having an upwardly extending post sized to snugly engage a central hole of the disc, a generally circular ridge member sized to define a disc receiving section of the tray member, and at least one spoke member connecting the central hub portion to the generally circular ridge member, the circular ridge member, central hub portion and at least one spoke member defining a cut-out area devoid of material.

3. The storage container of claim 2 wherein each spoke member has a series of rib members for enhancing structural rigidity of the tray member.

4. The storage container of claim 2 wherein the generally circular ridge member includes depressed portions in the height of the ridge member for receiving a user's finger for facilitating dislodgement of the disc from the upwardly extending post of the central hub portion.

5. The storage container of claim 2 wherein:
   (1) the disc receiving portion of the tray member includes a distal wall, a proximal wall, a first side and a second side;
   (2) the generally circular ridge member comprises a first semi-circular ridge member adjacent to the proximal wall and a second semi-circular ridge member adjacent to the distal wall;
   (3) the first side of the disc receiving portion includes a first ridge for connecting the end of the first semi-circular ridge member with the proximal wall, a first flat side surface for connecting the end of the first semi-circular ridge member to the end of the second semi-circular ridge member, and a second ridge for connecting the end of the second semi-circular ridge member with the distal wall;
   (4) the second side of the disc receiving portion includes a third ridge for connecting the end of the first semi-circular ridge member with the proximal wall, a second flat side surface for connecting the end of the first semi-circular ridge member to the end of the second semi-circular ridge member, and a fourth ridge connecting the end of the second semi-circular ridge member with the distal wall; and
   (5) the disc receiving portion has:
      (i) a first cut-out area devoid of material between the first ridge, the first semi-circular ridge and the proximal wall,
      (ii) a second cut-out area devoid of material between the second ridge, the second semi-circular ridge and the distal wall,
      (iii) a third cut-out area devoid of material between the third ridge, the first semi-circular ridge and the proximal wall, and
      (iv) a fourth cut-out area devoid of material between the fourth ridge, the second semi-circular ridge and the distal wall.

6. The storage container of claim 1 wherein the raised platform portion at the distal end of the tray member has a recessed area on the side adjacent to the disc receiving portion, the recessed area being positioned for receiving a finger-tip for permitting the distal end of the cover member to be accessed when the case member is in the closed position.

7. The storage container of claim 1 wherein:
   (1) the raised platform portion includes a distal end, a first side and a second side;
   (2) the base member includes:
      (i) a distal wall for supporting the distal end of the raised platform portion of the tray member,
      (ii) a first distal side wall for supporting the first side of the raised platform portion of the tray member, and
      (iii) a second distal side wall for supporting the second side of the raised platform portion of the tray member, and
   (3) the cover member has a first side wall and a second side wall which extend from the proximal to the distal ends on opposite sides of the cover member,
   wherein, when the case member is in the closed position, the first side wall of the cover member is positioned adjacent to the first distal side wall of the base member and the second side wall of the cover member is positioned adjacent to the second distal side wall of the base member such that the first and second distal side walls of the base member are disposed exteriorly of the cover member.

8. The storage container of claim 1 wherein:
   (1) the distal end of the cover member includes at least one protrusion member;
   (2) the raised platform portion of the tray member has an edge disposed adjacent to the disc receiving portion, said edge having at least one hole sized and shaped to receive the at least one protrusion member of the cover member, the at least one hole of the raised platform portion and the at least one protrusion member being spaced such that the at least one protrusion member snappingly engages the at least one hole when the case member is in the closed position, holding the cover member against the disc receiving portion of the tray member while maintaining the raised platform portion at the distal end of the tray member exteriorly of the cover member.

9. The storage container of claim 1 wherein the edge of the raised platform portion of the tray member adjacent to the disc receiving portion has at least one protrusion member, the distal end of the cover member has at least one hole sized and shaped to receive the at least one protrusion member of the raised platform portion, the at least one hole of the cover member and the at least one protrusion member of the raised platform portion being spaced such that the at least one protrusion member snappingly engages the at least one hole when the case member is in the closed position, holding the cover member against the disc receiving portion of the tray member while maintaining the raised platform portion at the distal end of the tray member exteriorly of the cover member.

10. The storage container of claim 1 wherein the raised platform portion at the distal end of the tray member includes a recessed area on the side adjacent to the disc receiving portion, the recessed area having an upper step and a lower step, the upper step being sized and positioned for permitting an edge of the distal end of the cover member to be accessed when the case member is in the closed position but not providing access to a disc attached to the disc receiving portion of the tray member, the lower step being positioned for permitting the disc attached to the disc receiving portion to be dislodged from the disc receiving portion when the case member is in the open position.

11. A storage container for a disc comprising:
   a unitarily formed case member, including a cover member, a base member, and a living hinge member joining the cover member to the base member, the living hinge member allowing the base member and cover member to pivot from a coplanar open position to an overlapping parallel plane closed position; the cover member having a proximal end and a distal end, the proximal end being adjacent to the living hinge member, and a tray member attached to the base member, the tray member having a proximal end and a distal end, the proximal end of the tray member being adjacent to the hinge member;

the tray member having a disc receiving portion disposed adjacent to the proximal end of the tray member, and a raised platform portion disposed adjacent to the distal end of the tray member, the raised platform portion including a recessed area on a side of the raised platform portion adjacent to the disc receiving portion; the tray member being sized and shaped to be joined to the base member such that when the case member is in the open position the disc receiving portion and the raised platform portion of the tray member are accessible and when the case member is in the closed position the disc receiving portion is covered by the cover member and the raised platform portion is disposed exteriorly of the cover member, the recessed area of the raised platform portion being adjacent to the distal end of the cover member.

12. The storage container of claim 11 wherein the living hinge member includes a first living hinge adjacent the cover member, a second living hinge adjacent the base member, and a spine extending between the first and second living hinges.

13. The storage container of claim 11 wherein the disc receiving portion includes
  (1) a central hub portion having an upwardly extending post sized to snugly engage a disc central hole,
  (2) a generally circular ridge member sized to define an annular disc area between the central hub portion and the generally circular ridge member, and
  (3) at least one spoke member connecting the central hub portion to the generally circular ridge member,
  the sections of the annular disc area not containing a spoke member being devoid of material.

14. The storage container of claim 13 wherein
  (1) the disc receiving portion includes a distal wall, a proximal wall, a first side and a second side;
  (2) the generally circular ridge member comprises a first semi-circular ridge member adjacent to the proximal wall and a second semi-circular ridge member adjacent to the distal wall;
  (3) the first side of the disc receiving portion has a first ridge connecting an end of the first semi-circular ridge member with the proximal wall, a first flat side surface connecting the end of the first semi-circular ridge member to an end of the second semi-circular ridge member, and a second ridge connecting the end of the second semi-circular ridge member with the distal wall;
  (4) the second side of the disc receiving portion has a third ridge connecting an end of the first semi-circular ridge member with the proximal wall, a second flat side surface connecting the end of the first semi-circular ridge member to an end of the second semi-circular ridge member, and a fourth ridge connecting the end of the second semi-circular ridge member with the distal wall; and
  (5) the disc receiving portion includes
    (i) a first cut-out area devoid of material between the first ridge, the first semi-circular ridge member and the proximal wall;
    (ii) a second cut-out area devoid of material between the second ridge, the second semi-circular ridge member and the distal wall;
    (iii) a third cut-out area devoid of material between the third ridge, the first semi-circular ridge member and the proximal wall; and
    (iv) a fourth cut-out area devoid of material between the fourth ridge, the second semi-circular ridge member and the distal wall.

15. The storage container of claim 14 wherein the distal end of the cover member has at least one protrusion member, the edge of the raised platform portion of the tray member adjacent to the disc receiving portion has at least one hole sized and shaped to receive the at least one protrusion member, the at least one hole of the raised platform portion and the at least one protrusion member of the cover member being spaced such that the at least one protrusion member snappingly engages the at least one hole when the case member is in the closed position, holding the cover member against the disc receiving portion of the tray member while maintaining the raised platform portion at the distal end of the tray member exteriorly of the cover member.

16. The storage container of claim 14 wherein an edge of the raised platform portion of the tray member adjacent to the disc receiving portion has at least one protrusion member, a distal end of the cover member has at least one hole sized and shaped to receive the at least one protrusion member, the at least one hole of the cover member and the at least one protrusion member of the raised platform portion being spaced such that the at least one protrusion member snappingly engages at least one hole when the case member is in the closed position, holding the cover member against the disc receiving portion of the tray member while maintaining the raised platform portion at the distal end of the tray member exteriorly of the cover member.

17. The storage container of claim 14 wherein the raised platform portion is disposed in a generally coplanar relationship with the cover member when the container is in the closed position.

18. A storage container for a disc comprising:
  a unitarily formed case member, including a cover member, a base member, and a living hinge member for joining the cover member to the base member, the living hinge member allowing the base member and cover member to pivot from a generally coplanar open position to an overlapping parallel plane closed position; the cover member having a proximal end and a distal end, the proximal end being adjacent to the living hinge member, and
  a tray member coupled to the base member, the tray member having a proximal end and a distal end, the proximal end being adjacent to the living hinge member, the tray member having a disc receiving portion adjacent to the proximal end of the tray member and a platform portion adjacent to the distal end of the tray member, the tray member being sized and shaped to be received by the base member such that the disc receiving portion is accessible when the case member is in the open position and the disc receiving portion is covered by the cover member when the case member is in the closed position, and the platform portion is disposed exteriorly of the case member adjacent to the distal end of the cover member when the cover member is in the closed position.

19. The storage container of claim 18 wherein the living hinge member includes a first living hinge adjacent the cover member, a second living hinge adjacent the base member, and a spine extending between the first and second living hinges.

20. A storage container for a disc comprising:
  a unitarily formed case member, including a cover member, a base member, and a living hinge member for joining the cover member to the base member, the living hinge member allowing the base member and cover member to pivot from a generally coplanar open position to an overlapping parallel plane closed position, and a tray member having a disc receiving portion and a platform portion, the tray member being sized and shaped to be received by the base member such that the disc receiving portion is accessible when the case member is in the open position and the disc receiving portion is covered by the cover member when the case member is in the closed position, and the platform portion is disposed exteriorly when the cover member is in the closed position, wherein the base member includes a proximal end wall extending substantially across the width of the base member, the living hinge member includes a first spine lock member on one side of the living hinge member and a second spine lock member on the opposite side of the living hinge member, the first and second spine lock members being sized and positioned so that when the living hinge member is brought perpendicular to the base member, the first and second spine lock members hookingly engage the opposite sides of the proximal end wall of the base member, for maintaining the living hinge member generally perpendicular to the base member when the cover member is subsequently pivoted between the open and closed positions.

21. The storage container of claim 20 wherein the first and second spine lock members are disengageable from the proximal end wall of the base member for allowing the living hinge member to be returned to a coplanar position with the base member.

22. The storage container of claim 20 wherein the cover member includes a proximal end wall, a first side wall and a second side wall; the first and second side walls extending from the proximal wall of the cover member to the distal end of the cover member along opposite sides of the cover member; the first side wall including a first side wall finger which extends beyond the proximal wall of the cover member, and the second side wall including a second side wall finger which extends beyond the proximal wall of the cover member, the first and second side wall fingers being sized and positioned such that when the spine lock members are attached to the proximal end wall of the base member and the case member is in the closed position the first and second side wall fingers extend beyond the proximal wall of the cover member around the spine lock members to the proximal wall of the base member.

23. A storage container for a disc comprising:

a unitarily formed case member, including a cover member, a base member, and a living hinge member for joining the cover member to the base member, the living hinge member allowing the base member and cover member to pivot from a generally coplanar open position to an overlapping parallel plane closed position, and a tray member having a disc receiving portion and a platform portion, the tray member being sized and shaped to be received by the base member such that the disc receiving portion is accessible when the case member is in the open position and the disc receiving portion is covered by the cover member when the case member is in the closed position, and the platform portion is disposed exteriorly when the cover member is in the closed position, wherein:

(1) the base member includes a proximal end wall and a distal end wall;

(2) the living hinge member is disposed adjacent to the proximal end wall; and (3) the platform portion of the tray member is disposed adjacent to the distal end wall.

\* \* \* \* \*